United States Patent
Tomar et al.

(10) Patent No.: US 12,293,146 B2
(45) Date of Patent: May 6, 2025

(54) OVERLAY RULE INTEGRATION FOR DOCUMENT MIGRATION

(71) Applicant: MICRO FOCUS LLC, Santa Clara, CA (US)

(72) Inventors: Paritosh Tomar, Hyderabad (IN); Amit Narang, Hyderabad (IN); Anthony John Wiley, San Diego, CA (US)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 18/204,846

(22) Filed: Jun. 1, 2023

(65) Prior Publication Data
US 2024/0403541 A1 Dec. 5, 2024

(51) Int. Cl.
*G06F 40/166* (2020.01)
(52) U.S. Cl.
CPC .................. *G06F 40/166* (2020.01)
(58) Field of Classification Search
CPC ...................................... G06F 40/166
See application file for complete search history.

(56) References Cited

U.S. PATENT DOCUMENTS

| | | | |
|---|---|---|---|
| 11,640,283 B2 * | 5/2023 | Xie | G06F 3/0481 715/762 |
| 11,755,816 B1 * | 9/2023 | Mason | G06F 16/24564 715/234 |
| 11,782,587 B1 * | 10/2023 | Keel | G06F 40/117 715/202 |
| 2016/0188549 A1 * | 6/2016 | Wei | G06F 16/00 715/744 |

FOREIGN PATENT DOCUMENTS

| | | |
|---|---|---|
| CN | 109525622 | 3/2019 |
| JP | WO2009057224 | 3/2011 |
| RU | 2697647 | 8/2019 |

* cited by examiner

*Primary Examiner* — Cao H Nguyen
(74) *Attorney, Agent, or Firm* — Sheridan Ross P.C.

(57) ABSTRACT

Documents are often generated using a customer communication management (CCM) application that utilizes rules to select and/or modify certain fragments of a document. By analyzing the rules and content that produced a certain fragment, a second CCM application may be automatically provided with the rules, such as when the first set of rules are not available for porting to a second system. Accordingly, a server may access a rule comprising a condition, a document fragment, and a rule identifier. A server may generate a first document to comprise visible content and hidden content. Generating the first document may comprise evaluating the rule and, when the rule is true, including the document fragment as a portion of the visible content and including the rule identifier as a portion of hidden content. A server may provide the first document to a destination.

20 Claims, 7 Drawing Sheets

OVERLAY RULE INTEGRATION FOR DOCUMENT MIGRATION

FIELD OF THE DISCLOSURE

The invention relates generally to systems and methods for automatically programming rules derived from documents.

BACKGROUND

Document creation can be simple or highly complex. Simple documents may have variables, such as a recipient's name or address. More complex documents, such as insurance contracts or loan agreements, may have complex rules that determine which words, paragraphs, or entire sections to include and/or modify for a particular document. Once the rule(s) execute, a document is created, often in Portable Document Format (PDF).

SUMMARY

When a document is created, document fragments comprising text and/or images are dynamically selected based on a rule and, when a condition of the rule is true, the document fragments are included. Rules may be applied and overlayed onto the document, such as a hidden portion of the document's file. Additionally or alternatively, rules may be versioned and overlayed onto the document in sets determined by a particular version of a rule or rules. The rule may further comprise variables affecting the content of the document fragment, such as to retrieve a name to use to populate a name portion of the document fragment. Rules may be nested. For example, if "Rule 9" is true, add document fragment "CA_Resident_1" and evaluate "Rule 9.1" and, when true, append the added document fragment with sentence "Marin_CA_County_Resident_1." After the document fragments, and other text, are identified, a document is created. However, in the prior art, the association between the fragments and the rule that selected the fragments must be maintained externally to the document. The prior art fails to maintain any association between the document itself and the particular rule.

Often the rules are, or become, unavailable, such as due to the source of the rule being stored as machine code with no available source code or documentation. For example, the rules may be maintained as a portion of a document generation application that lacks the ability to be updated, such as by implementing features to address security vulnerabilities or adding new features. As a result, the system is left to operate in an impaired state unless ported over to a new system. However, if the rules have no human-readable form or other identification, porting the rules to a new system may require manually rebuilding the rules on the new system.

In some applications, a document and logic for associating a rule with the document and/or content within the document may use a proprietary format. However, in prior art systems, there is no way to share such logic with other systems which, in turn, use their own proprietary format. Still, even if two systems use the same content format, they may use different rule association logic. As such, it can be highly complex, time-consuming, and resource intensive to migrate content and a means to control the content from one system to another.

Advantageously, various embodiments and configurations of the present invention address this problem. In some aspects, techniques are provided that retrieve content fragments and rules for including the content fragments from a system and store/export/associate them so that another system may retrieve/import/access the content fragments and associated rules. In this way, a document may be parsed and/or distilled into content fragments and the control over the content fragments defined and maintained across one or more disparate systems.

In a non-limiting example, content fragments and associated rules may be defined and accessed to generate communications. Content fragments are controllable in such communications using rule conditions, such as, but not limited to, a rule condition that indicates to render the content fragment only if the communication is generated for a particular purpose and/or within a particular context. Further to this, a customizable communication may only include a content fragment when the communication is viewed in the State of California. Here, the render-only-if-viewed-in-California rule will be associated with the content fragment and triggered when encountering the content fragment. If the rule is true (i.e., the content fragment is being viewed in California), then the content fragment will be rendered.

Moreover, content fragment/rule associations may be generated, normalized, and shared across any number of systems. Using embodiments of the present invention, previously un-sharable/unportable content generation formats and rules in one system (such as a legacy system) may be migrated to another system or even redefined to expand content generation in the same system. Embodiments may be used to build communications piece-by-piece in a highly flexible, transparent manner, where one or more rules control aspects such as (but not limited to) content fragment inclusion, placement, color, size, etc. Templates may be used to generate content communications by parsing a template for content segments, accessing associated rules, and controlling the content segments based on the rules, thereby generating highly customizable, context and audience driven content.

These and other needs are addressed by the various embodiments and configurations of the present invention. The present invention can provide a number of advantages depending on the particular configuration. These and other advantages will be apparent from the disclosure of the invention(s) contained herein.

In one embodiment, systems and methods are provided that embed an identifier of a rule into a document fragment (text and/or images) such that the identifier is placed in a hidden portion of the document (e.g., metadata, invisible text, etc.). The hidden identifier, or other content placed in the hidden portion, remains visible only to systems configured to access the hidden portion of the document. Accordingly, the identifier is not presented as a portion of the document itself and is not presented when the document is displayed by an electronic device or on paper when printed. As a result, a document may be generated and one or more rules utilized to generate at least a portion of the document.

The advantages of using rules to generate documents are generally well known. Wording for a document fragment can be vetted once and used many times without the work and potential for errors that may occur had the text been generated from scratch. This may be particularly relevant for legal documents (e.g., loans, leases, etc.) that may have unexpected or undesired effects from even a minor variation that could occur for scratch-written documents. Similarly, documents may be generated to ensure no relevant portion is omitted or no superfluous portion is included. Additionally, the document may be personalized, such as to include a customer's name, address, or other recipient-specific information.

By including an indicator of a rule in the document, the document may be used to train other systems. The indicator may be a name, index, or other indicia of the rule or the rule itself. The indicator is maintained in a document portion different from the presentation content so that the document, as viewed or printed, has content that excludes the content of the hidden portion. Additionally or alternatively, the indicator may be encrypted.

A target composition tool or application provides migration services and receives documents generated with a hidden portion comprising one or more rule indicators. If not otherwise provided (e.g., stored in the document's hidden portion), the rules themselves are made accessible to the target composition tool. The target composition tool extracts the document fragment resulting from a rule and parses the rule identifier. The resulting rule identifier and document fragment are then mapped to a rule identifier. A secondary system may be programmed with the extracted rule and corresponding document fragment.

The need for rule extraction arises for several reasons. Primarily, the migration of legacy applications to another system is often complex and error prone. While there may be some obvious associations (e.g., a document for a loan includes a general introduction about the enterprise and loan division), other associations are often hidden in complexity and nuance of architecture, design, and code, which makes it challenging to accurately determine corresponding rules and document fragments.

With the rapid growth of mobile, distributed, cloud computing, and open-source technologies, and customizable, industry-specific commercial off-the-shelf (COTS) products and software as a service (SaaS) products, many applications are being re-engineered as cloud-native web and mobile apps. Legacy systems are being replaced with COTS and SaaS, which have given legacy logic new service once retrofit into these new applications.

By adding a custom field in a hidden portion of a document, the custom field may be used to include a rule indicator or the rule itself. Subsequent analysis of the document can then be used to configure another system with the rule.

In some aspects, the techniques described herein relate to a computer-implemented method of generating document content creation rules, including: accessing a rule including a condition, a document fragment, and a rule identifier; generating a first document to include visible content and hidden content; wherein generating the first document includes evaluating the number of rules and, when at least one rule is true, including the document fragment as a portion of the visible content and including the rule identifier of the at least one rule of the number of rules as a portion of hidden content; and providing the first document to a destination.

In some aspects, the techniques described herein relate to a computer-implemented method, wherein accessing the rule further includes accessing the rule identifier from a first document, wherein the first document includes the rule identifier as hidden content.

In some aspects, the techniques described herein relate to a computer-implemented method, wherein accessing the rule further include accessing the condition and the document fragment from a first data storage that correspond to the rule identifier.

In some aspects, the techniques described herein relate to a computer-implemented method, further including generating the rule including: accessing a plurality of candidate documents each including a plurality of document fragments and a plurality of candidate conditions; and analyzing the plurality of candidate documents to identify one of the plurality of candidate conditions that is true in a portion of the plurality of candidate documents comprising a corresponding one of the plurality of document fragments being present therein.

In some aspects, the techniques described herein relate to a computer-implemented method, wherein the document fragment includes at least one of text or an image.

In some aspects, the techniques described herein relate to a computer-implemented method, wherein the rule identifier includes a Universally Unique Identifier (UUID).

In some aspects, the techniques described herein relate to a computer-implemented method, wherein the rule identifier includes the condition.

In some aspects, the techniques described herein relate to a system, including: a computing device including at least one processor coupled to a computer memory comprising instructions therein executed by the at least one processor; a data storage including a number of rules each of the number of rules comprising a condition and a corresponding document fragment; generating, by the computing device, accessing, by the computing device, a first document including visible content and hidden content, wherein generating the first document includes evaluating the rule and, when the rule is true, including the document fragment as a portion of the visible content in the first document and including a rule identifier as a portion of hidden content; and providing the first document to a destination.

In some aspects, the techniques described herein relate to a system, wherein accessing the rule further includes accessing the rule identifier from a second document, wherein the second document includes the rule identifier as hidden content.

In some aspects, the techniques described herein relate to a system, wherein accessing the rule further include accessing the condition and the document fragment from a first data storage that correspond to the rule identifier.

In some aspects, the techniques described herein relate to a system, further including generating the rule including: accessing a plurality of candidate documents each including a plurality of document fragments and a plurality of candidate conditions; and analyzing the plurality of candidate documents to identify one of the plurality of candidate conditions that is true in a portion of the plurality of candidate documents comprising a corresponding one of the plurality of document fragments being present therein.

In some aspects, the techniques described herein relate to a system, wherein the document fragment includes at least one of text or an image.

In some aspects, the techniques described herein relate to a system, wherein the rule identifier includes a Universally Unique Identifier (UUID).

In some aspects, the techniques described herein relate to a system, wherein the rule identifier includes the condition.

In some aspects, the techniques described herein relate to a system, including: means to access a rule including a condition, a document fragment, and a rule identifier; means to generating a first document to include visible content and hidden content and wherein the means to generate the first document further includes means to evaluate the rule and, when the rule is true, means to include the document fragment as a portion of the visible content in the first document and including the rule identifier as a portion of hidden content; and means to provide the first document to a destination.

In some aspects, the techniques described herein relate to a system, wherein the means to access the rule further includes means to access the rule identifier from a second document, wherein the second document includes the rule identifier as hidden content.

In some aspects, the techniques described herein relate to a system, wherein means to access the rule further include means to access the condition and the document fragment from a first data storage that correspond to the rule identifier.

In some aspects, the techniques described herein relate to a system, further including: means to access a plurality of candidate documents each including a plurality of document fragments and a plurality of candidate conditions; and means to analyze the plurality of candidate documents to identify one of the plurality of candidate conditions that is true in a portion of the plurality of candidate documents comprising a corresponding one of the plurality of document fragments being present therein.

In some aspects, the techniques described herein relate to a system, wherein the document fragment includes at least one of text or an image.

In some aspects, the techniques described herein relate to a system, wherein the rule identifier includes the condition.

In some aspects, the techniques described herein relate to a computer-implemented method of generating content fragments according to rules, comprising receiving a content fragment from a source, extracting, from the source, a rule for processing the content fragment, the rule for processing the content fragment comprising a unique rule identifier, defining data for generating the content fragment, comprising associating in the data the content fragment and the unique rule identifier, storing the data, wherein the stored data is accessible by a content generator, and rendering, by the content generator, the content fragment based on the stored data.

In some aspects, the techniques described herein relate to a computer-implemented method, wherein the content fragment comprises text, and associating in the data the content fragment and the unique rule identifier further comprises embedding the unique rule identifier with the text in the stored data, and rendering, by the content generator, the content fragment based on the stored data, further comprises retrieving, based on the unique rule identifier stored in the data, the rule for processing the content fragment, and determining rendering of the text based on evaluating the rule for processing the content fragment.

In some aspects, the techniques described herein relate to a computer-implemented method, wherein the content fragment comprises imagery, and associating in the data the content fragment and the unique rule identifier further comprises: embedding the unique rule identifier with the imagery in the stored data, and rendering, by the content generator, the content fragment based on the stored data, further comprises: retrieving, based on the unique rule identifier stored in the data, the rule for processing the content fragment, and determining rendering of the imagery based on evaluating the rule for processing the content fragment.

In some aspects, the techniques described herein relate to a computer-implemented method, wherein the stored data comprises a portable data format (PDF) file, and rendering, by the content generator, the content fragment based on the stored data, further comprises: retrieving the PDF file, and parsing the PDF file to access the content fragment and the associated unique rule identifier.

In some aspects, the techniques described herein relate to a computer-implemented method, wherein the content fragment is a plurality of content fragments, and extracting, from the source, a rule for processing the content fragment, the rule for processing the content fragment comprising a unique rule identifier, further comprises: extracting, from the source, a rule for processing each of the content fragments, and rendering, by the content generator, the content fragment based on the stored data, further comprises: rendering each of the content fragments based on the stored data.

In some aspects, the techniques described herein relate to a computer-implemented method, further comprising: generating a template for generating content, the template comprising at least one of the plurality of content fragments.

In some aspects, the techniques described herein relate to a computer-implemented method, wherein the template further comprises rendering configuration for the plurality of content fragments, and rendering, by the content generator, the content fragment based on the stored data, further comprises: rendering the template based on the rendering configuration for the plurality of content fragments.

In some aspects, the techniques described herein relate to a system for generating content fragments according to rules, comprising: a processor and a non-transitory memory coupled to the processor and comprising instructions executable by the processor for: receiving a content fragment from a source, extracting, from the source, a rule for processing the content fragment, the rule for processing the content fragment comprising a unique rule identifier, defining data for generating the content fragment, comprising: associating in the data the content fragment and the unique rule identifier, storing the data, wherein the stored data is accessible by a content generator, and rendering, by the content generator, the content fragment based on the stored data.

In some aspects, the techniques described herein relate to a system, wherein the content fragment comprises text, and associating in the data the content fragment and the unique rule identifier further comprises: embedding the unique rule identifier with the text in the stored data, and rendering, by the content generator, the content fragment based on the stored data, further comprises: retrieving, based on the unique rule identifier stored in the data, the rule for processing the content fragment, and determining rendering of the text based on evaluating the rule for processing the content fragment.

In some aspects, the techniques described herein relate to a system, wherein the content fragment comprises imagery, and associating in the data the content fragment and the unique rule identifier further comprises: embedding the unique rule identifier with the imagery in the stored data, and rendering, by the content generator, the content fragment based on the stored data, further comprises: retrieving, based on the unique rule identifier stored in the data, the rule for processing the content fragment, and determining rendering of the imagery based on evaluating the rule for processing the content fragment.

In some aspects, the techniques described herein relate to a system, wherein the stored data comprises a portable data format (PDF) file, and rendering, by the content generator, the content fragment based on the stored data, further comprises: retrieving the PDF file and parsing the PDF file to access the content fragment and the associated unique rule identifier.

In some aspects, the techniques described herein relate to a system, wherein the content fragment is a plurality of content fragments, and extracting, from the source, a rule for processing the content fragment, the rule for processing the content fragment comprising a unique rule identifier, further comprises: extracting, from the source, a rule for processing each of the content fragments, and rendering, by the content generator, the content fragment based on the stored data, further comprises: rendering each of the content fragments based on the stored data.

In some aspects, the techniques described herein relate to a system, the instructions further executable by the processor for generating a template for generating content, the template comprising at least one of the plurality of content fragments.

In some aspects, the techniques described herein relate to a system, wherein the template further comprises rendering configuration for the plurality of content fragments, and rendering, by the content generator, the content fragment based on the stored data, further comprises: rendering the template based on the rendering configuration for the plurality of content fragments.

In some aspects, the techniques described herein relate to computer program product for generating content fragments according to rules, the computer program product stored in a non-transitory computer readable medium and comprising instructions for receiving a content fragment from a source, extracting, from the source, a rule for processing the content fragment, the rule for processing the content fragment comprising a unique rule identifier, defining data for generating the content fragment, comprising: associating in the data the content fragment and the unique rule identifier, storing the data, wherein the stored data is accessible by a content generator, and rendering, by the content generator, the content fragment based on the stored data.

In some aspects, the techniques described herein relate to computer program product, wherein the content fragment comprises text, and associating in the data the content fragment and the unique rule identifier further comprises: embedding the unique rule identifier with the text in the stored data and rendering, by the content generator, the content fragment based on the stored data, further comprises: retrieving, based on the unique rule identifier stored in the data, the rule for processing the content fragment, and determining rendering of the text based on evaluating the rule for processing the content fragment.

In some aspects, the techniques described herein relate to computer program product, wherein the content fragment comprises imagery, and associating in the data the content fragment and the unique rule identifier further comprises: embedding the unique rule identifier with the imagery in the stored data, and rendering, by the content generator, the content fragment based on the stored data, further comprises: retrieving, based on the unique rule identifier stored in the data, the rule for processing the content fragment, and determining rendering of the imagery based on evaluating the rule for processing the content fragment.

In some aspects, the techniques described herein relate to computer program product, wherein the stored data comprises a portable data format (PDF) file, and rendering, by the content generator, the content fragment based on the stored data, further comprises: retrieving the PDF file and parsing the PDF file to access the content fragment and the associated unique rule identifier.

In some aspects, the techniques described herein relate to computer program product, wherein the content fragment is a plurality of content fragments, and extracting, from the source, a rule for processing the content fragment, the rule for processing the content fragment comprising a unique rule identifier, further comprises: extracting, from the source, a rule for processing each of the content fragments, and rendering, by the content generator, the content fragment based on the stored data, further comprises: rendering each of the content fragments based on the stored data.

In some aspects, the techniques described herein relate to computer program product, the instructions further executable by the processor for: generating a template for generating content, the template comprising at least one of the plurality of content fragments and rendering configuration for the plurality of content fragments, and rendering, by the content generator, the content fragment based on the stored data, further comprises: rendering the template based on the rendering configuration for the plurality of content fragments.

A system on a chip (SoC) including any one or more of the above aspects of the embodiments described herein.

One or more means for performing any one or more of the above aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above embodiments or aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112 (f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
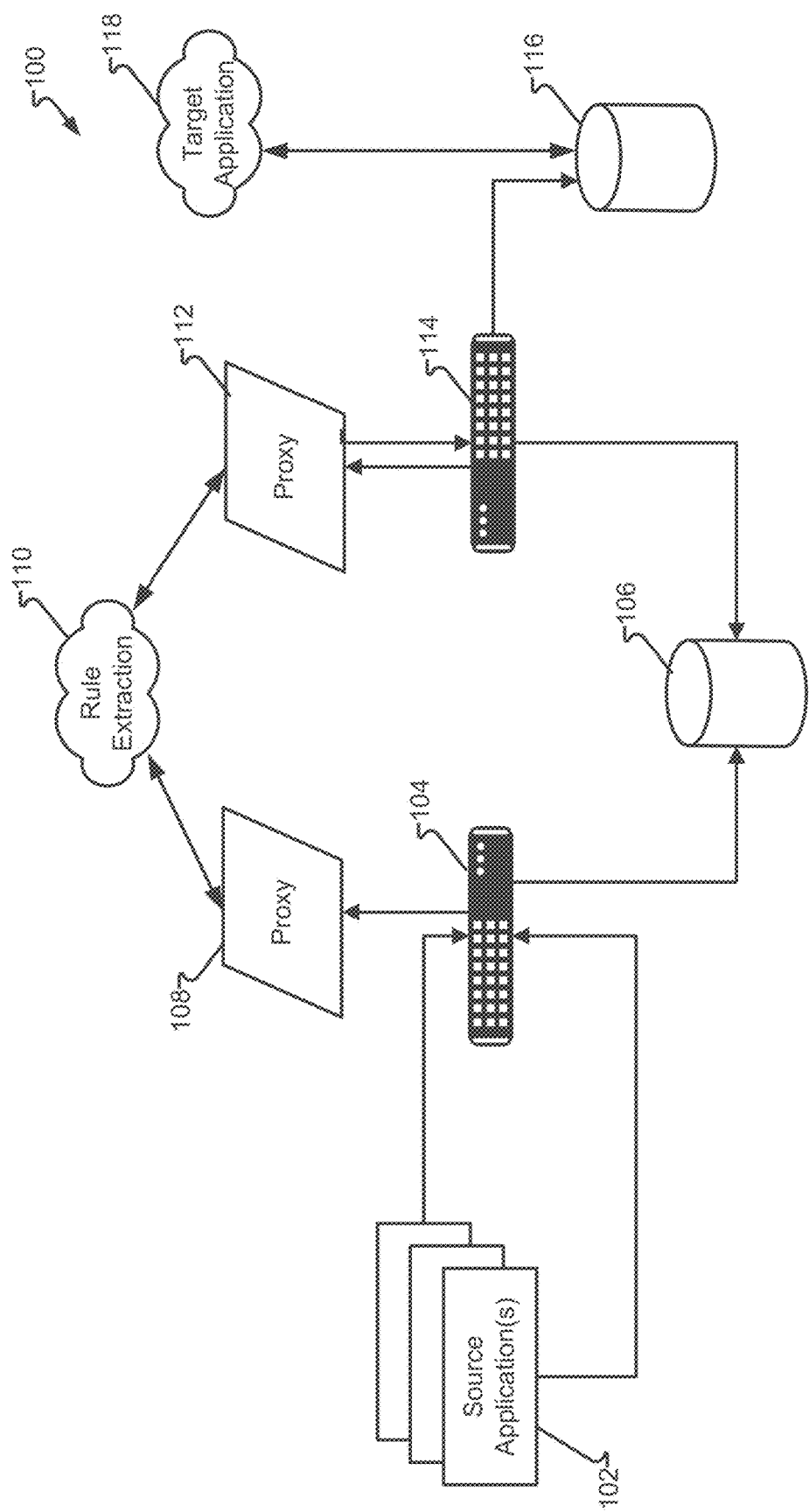
FIG. 1 depicts a system in accordance with embodiments of the present disclosure.

FIG. 1 depicts system 100 in accordance with embodiments of the present disclosure. System 100, in one embodiment, executes one or more source applications 102 to generate one or more output documents. Source applications 102 similarly provide rule information (e.g., a rule identifier, condition, document fragment, document fragment location, etc.). Server 104 executes a service to embed the rule into each of the documents that was generated using at least one rule. Server 104 may comprise a micro service or other application. As a result, the documents created comprise rule identification embedded therein. Proxy 108 provides communication between server 104 and rule extraction 110.

Rule extraction 110 receives the documents and extracts the rule identifier for the documents. Additionally or alternatively, rule extraction 110 extracts the rule identifier based on a location (e.g., coordinates for an image, a section of a document, a line number, a paragraph number, a page number, etc.). Rule extraction 110 provides the rule identifier to a second system, such as a system comprising at least target application 118 and server 114 and optionally comprising proxy 112, facilitating communications between rule extraction 110 and server 114.

In another embodiment, server 114 accesses file storage 106, comprising rule definitions provided by server 104. Server 114 may execute a microservice or other application to extract document fragments and the corresponding rules. The extracted rule and document fragments are then stored in database 116 and made available to target application 118. Target application 118 may then generate documents utilizing the rules made available thereto automatically and without human intervention.

Figure 2:
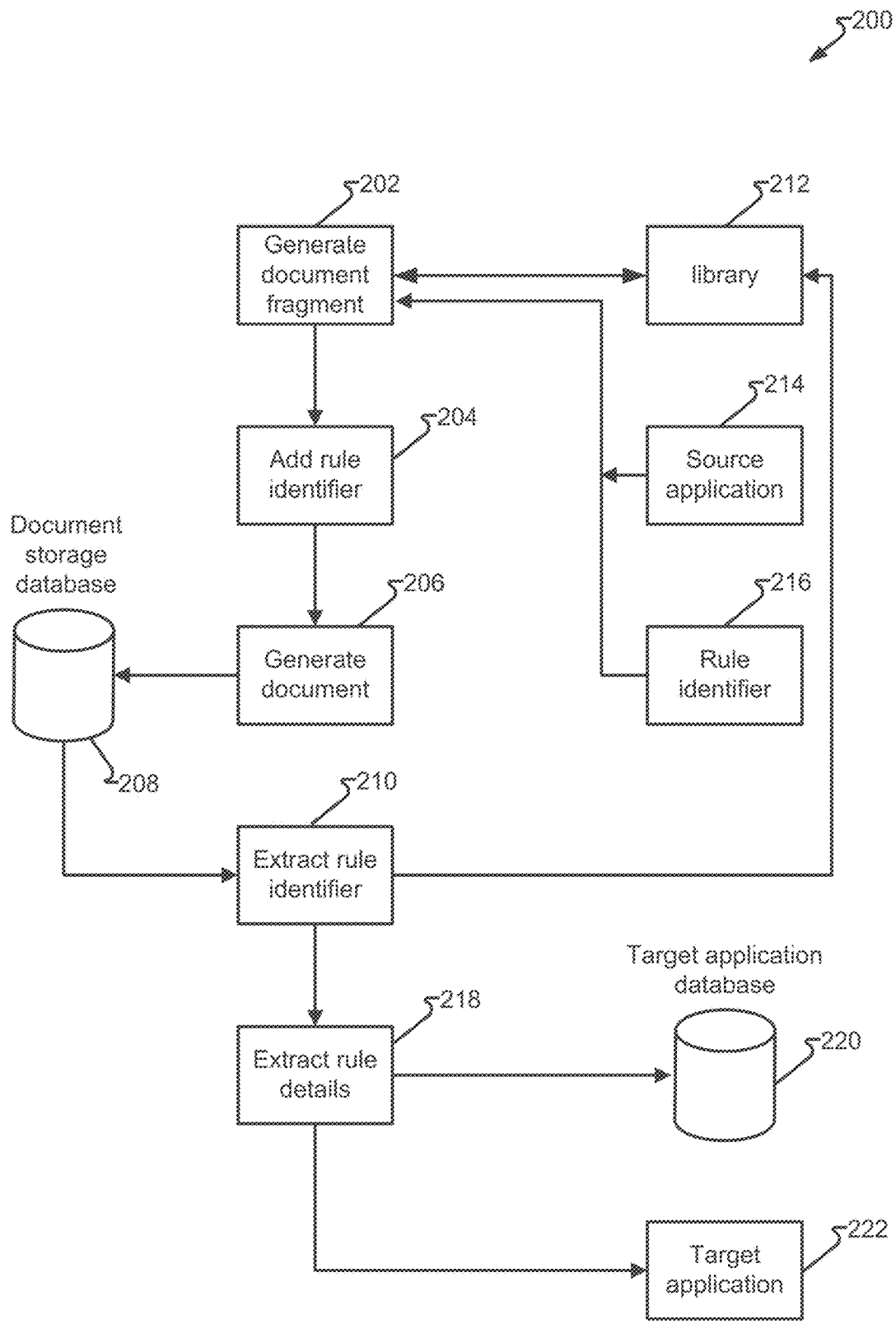
FIG. 2 depicts a data flow in accordance with embodiments of the present disclosure.

FIG. 2 depicts data flow 200 in accordance with embodiments of the present disclosure. In one embodiment, data flow 200 is embodied as machine-readable instructions maintained in a non-transitory memory that when read by a machine, such as at least one processor of a server, cause the machine to execute the instructions and thereby execute data flow 200. The processor of the server may include, but is not limited to, at least one processor of server 104 and/or 114.

In one embodiment, step 202 receives a document or document fragment generated by source application 214 and rule information from rule identifier 216 and generates a document fragment. Rule information may refer to a rule identifier, condition, document fragment to include with the condition is true, or combinations thereof. In one embodiment, source applications 102 (see FIG. 1) may comprise source application(s) 214. In other applications, source applications 102 and source applications 214 are discrete. Custom fields may be utilized to store rule information maintaining the association as preserved in library 212.

Process 204 adds a rule identifier to a hidden portion of the document in a hidden portion of the generated document or, more specifically, at a particular location (e.g., a paragraph, a page, a section, coordinates for an image, etc.). Process 206 generates the document, such as in a PDF format, for storage in document storage database 208. In this way, rules may be overlayed onto the document, such as the hidden portion of the document, and applied to content generation. Such rules may be versioned and overlayed onto the document in sets determined by a particular version of a rule or rules.

Subsequently, process 210 extracts the rule information from the document maintained in data storage 208. Process 218 extracts rule details, such as the condition to be evaluated, the document fragment to include when the condition is true, and, optionally, the location information. Process 218 may analyze a plurality of documents, such as with a machine learning module trained to recognize patterns, in order to extract rule details and/or determine a candidate condition that produced a particular document fragment. For example, if a candidate document fragment occurred universally, such as a signature block, then the rule is determined to be ubiquitous and non-conditional. However, if a particular passage occurs only occasionally, then a condition of a rule must have been evaluated as true. Accordingly, process 218 accesses the document, and optionally other sources of data (e.g., records, customer records, etc.), and determines a commonality that, when true, results in the document fragment being included and, when not true, results in the document fragment being absent.

A document may be a candidate document to reveal a rule embedded therein. For example, a candidate document may have a number of candidate conditions that resulted in a particular document fragment being present in the candidate document. Conversely, the condition was absent from other documents, wherein the document fragment is absent.

The rule and rule details are then stored in target application database 220 and made available for subsequent use by target application 222.

Figure 3:
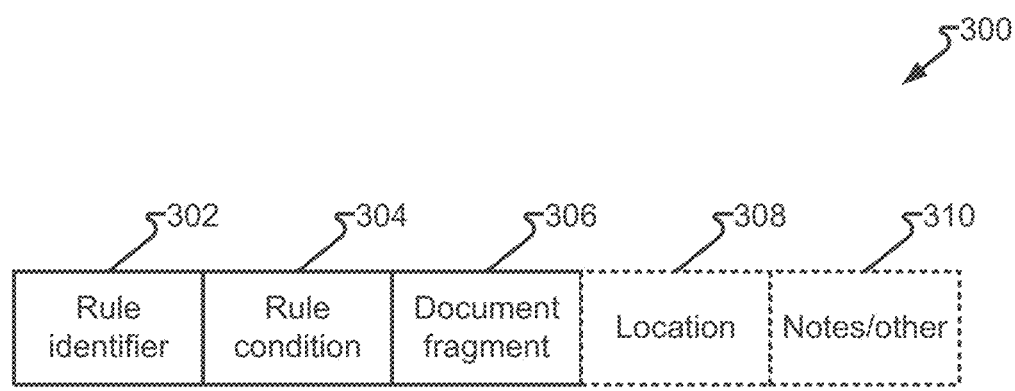
FIG. 3 depicts a data structure in accordance with embodiments of the present disclosure.

FIG. 3 depicts data structure 300 in accordance with embodiments of the present disclosure. Data structure 300 is variously embodied and may define the structure of a record, such as one or more data records stored in a database, such as file storage 106, database 116, document storage database 208, target application database 220, and/or another data repository. Data structure 300 may comprise a number of fields, such as rule identifier 302 (e.g., a UUID, document fragment name, etc.), rule condition 304, document fragment 306 (e.g., text, an image, or a location of text, a location of an image, etc.). Optionally, the number of fields may comprise location 308 (e.g., page, paragraph, image coordinates, etc.) and/or notes/other 310 as a matter of design choice.

In some embodiments, versioning of overlay rules includes versions of a rule with different UUIDs 302. Here, a first version of a rule includes a first UUID 302 and a second version of a rule includes a second UUID 302, different from the first UUID 302. In this way, rules may be updated to meet the evolving needs and desires of the overall content migration, while (optionally) maintaining prior rule versions. Such an approach permits rule hierarchies to be branched into different versions and groupings.

In some embodiments, versioning of overlay rules includes modifying rule parameters, while the UUID 302 is maintained. In this approach, the parameters of the rule may be modified (for example, rule condition 304 and/or document fragment 306). Such an approach provides the flexibility to modify a rule condition 304 for a particular document fragment 306. In the same or different embodiment, document fragment 306 is modified for rule condition 304.

Figure 4:
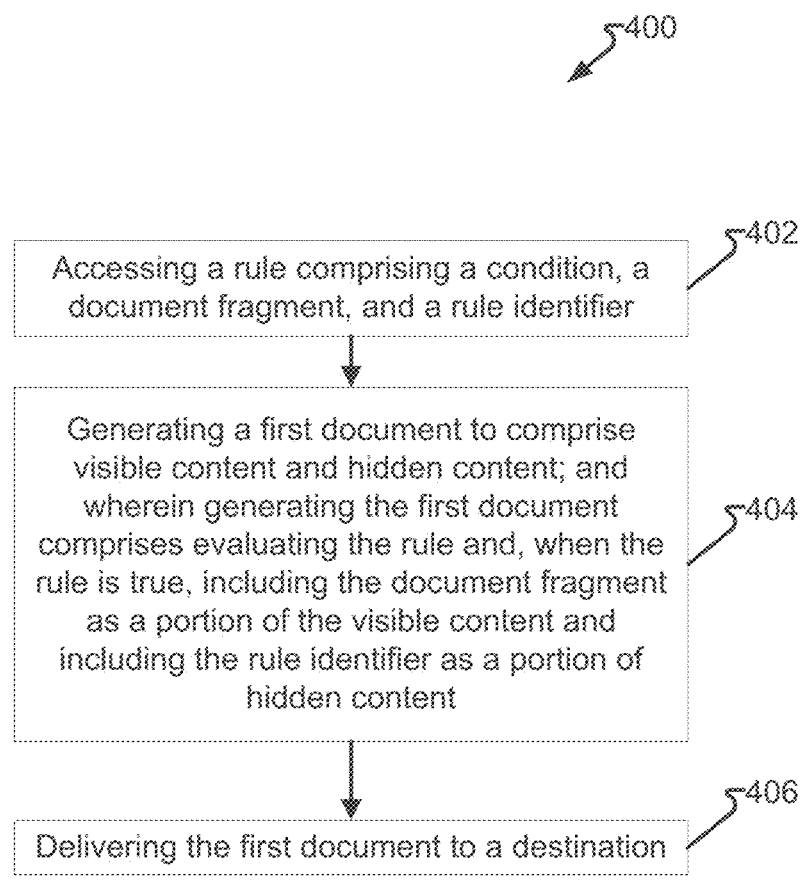
FIG. 4 depicts a process in accordance with embodiments of the present disclosure.

FIG. 4 depicts process 400 in accordance with embodiments of the present disclosure. In one embodiment, process 400 is embodied as a computer-implemented method comprising machine-readable instructions maintained in a non-transitory memory that, when read by a machine, such as at least one processor of a server, cause the machine to execute the instructions and thereby execute process 400. The processor of the server may include, but is not limited to, at least one processor of server 104 and/or 114.

Step 402 accesses a rule comprising a condition, a document fragment, and a rule identifier. Step 404 generates a first document to include visible content and hidden content. Generating the first document includes evaluating the rule and, when the rule is true, including the document fragment as a portion of the visible content and including the rule identifier as a portion of hidden content. Step 406 provides, and preferably delivers, the first document to a destination. The destination may be a data storage or a recipient of the document.

Figure 5A:
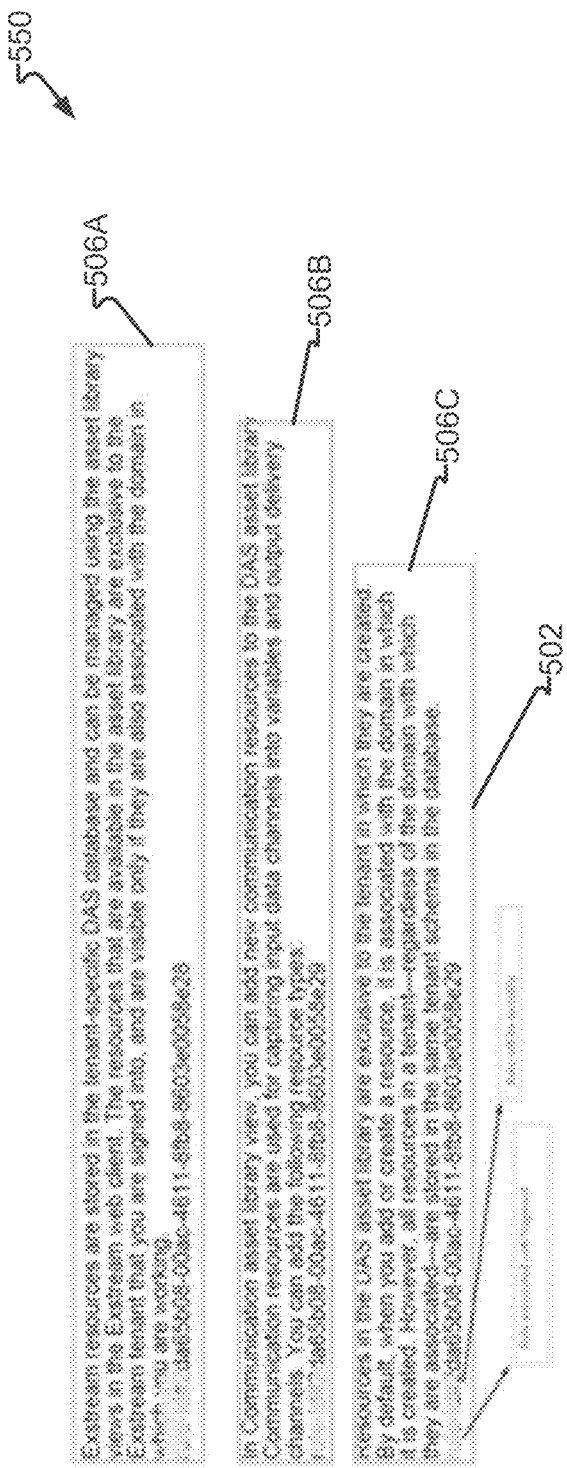
FIGS. 5A and 5B depict a document generated in accordance with embodiments of the present disclosure.
Figure 5B:
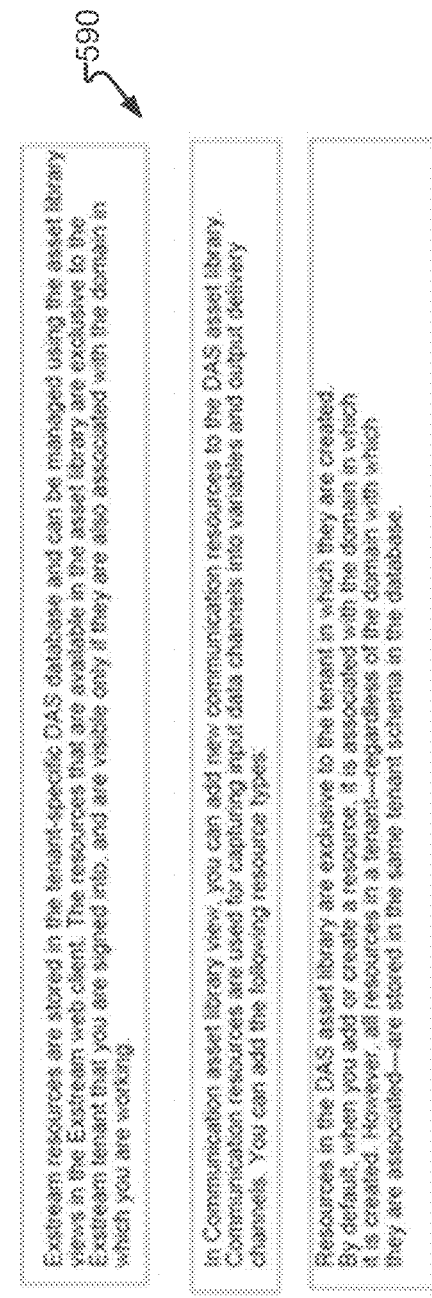

FIG. 5A depicts document fragments 506A, 506B, 506C and rule identifier 502 generated in document 550. In some embodiments, document 550 comprises a PDF document. Document fragments 506A, 506B, 506C comprise text. Rule identifier 502 is invisible in that it is not generated in the output 590, while document fragments 506A, 506B, 506C are visible in that they are generated in the output 590, as depicted in FIG. 5B.

Figure 6:
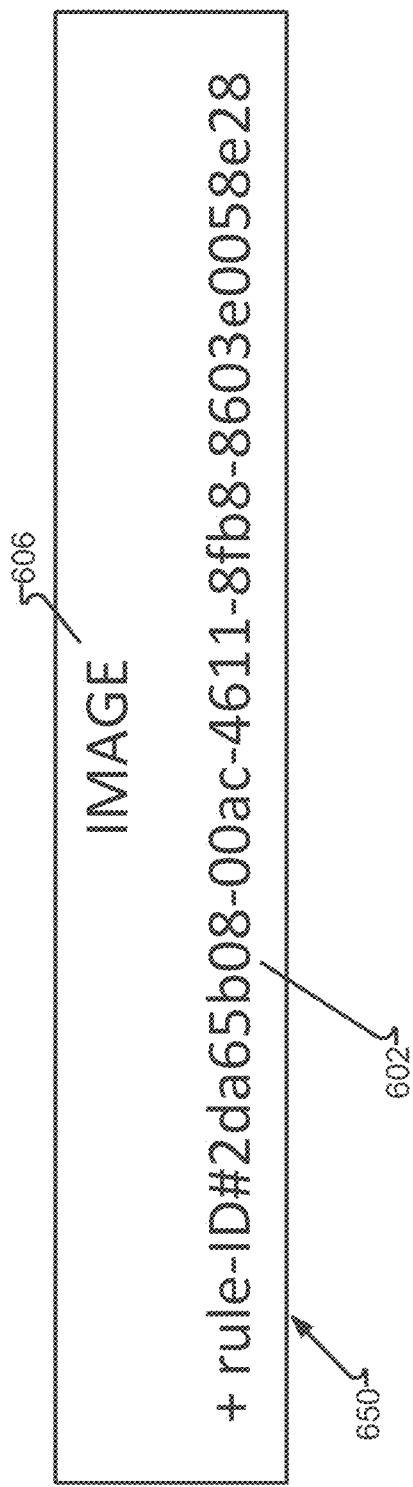
FIG. 6 depicts a document generated in accordance with embodiments of the present disclosure.

FIG. 6 depicts document fragment 606 and rule identifier 602 generated in document 650. In some embodiments, document 650 comprises a PDF document. Document fragment 606 comprises imagery. Rule identifier 602 is invisible in that it is not generated in the output, while document fragment 606 is visible in that it is generated in the output.

Embodiments of the present disclosure include techniques for generating content fragments according to rules, such techniques comprising receiving a content fragment from a source. A content fragment includes, but is not limited to, text, imagery, audio-visual content, and other forms of data, information, and/or media assets. In some instances, a document fragment comprises a content fragment and makes up at least a portion of a document.

The source includes, but is not limited to, a content repository system, a file system on a client computer or a server computer, cloud storage over a distributed, networked system, database, and/or device storage local to a device and may employ a variety of methods for storing content fragments and rules.

A rule comprises a condition for processing the content fragment and is extracted from the source. The rule is identifiable by a unique rule identifier. Such a unique rule identifier uniquely defines the rule which may be one of many rules for processing a variety of content fragments. One of ordinary skill in the art will understand that several methods exist for generating a unique identifier for each rule such as a random number generator.

Data is defined for generating the content fragment; such a data definition associates the content fragment with the rule or, alternatively in some embodiments, the unique rule identifier for the rule and is stored and accessible by a content generator. The data may be stored in any number of ways, including, but not limited to, in a file, database in a variety of formats, etc. In one instance, the data is stored as a portable data format (PDF) file. Other non-limiting formats may be used, such as XML, image formats, text formats, and more.

Furthermore, the data definitions may use different methods for associating the content fragment with the unique rule identifier. In one non-limiting example, when the content fragment includes text, the unique rule identifier may be appended or embedded after the text in the data. In another non-limiting example, when the content includes imagery, the unique rule identifier may be a portion of the imagery data stream.

The content generator may read the data, parse it, and render the content fragment based on the associated rule. In some instances, the associated unique rule identifier stored in the data with the content fragment is used to retrieve a rule condition, which defines how to process the content fragment. In a non-limiting example, a rule condition may define that if the content fragment is being accessed for display to a user located in California, then display the content fragment or, alternatively, if the user is not located in California, then do not display the content fragment.

In some embodiments, the unique rule identifier is stored in a database, in a rule record, the rule record also comprising the rule condition. Here, the content generator retrieves the rule condition for the rule record in the database based on the unique rule identifier for the rule record.

In some embodiments, a template is generated for generating content, the template comprising at least one of the plurality of content fragments. The template may include rendering configuration for the plurality of content fragments, the rendering configuration to control inclusion and rendering format for the plurality of content fragments.

Figure 7:
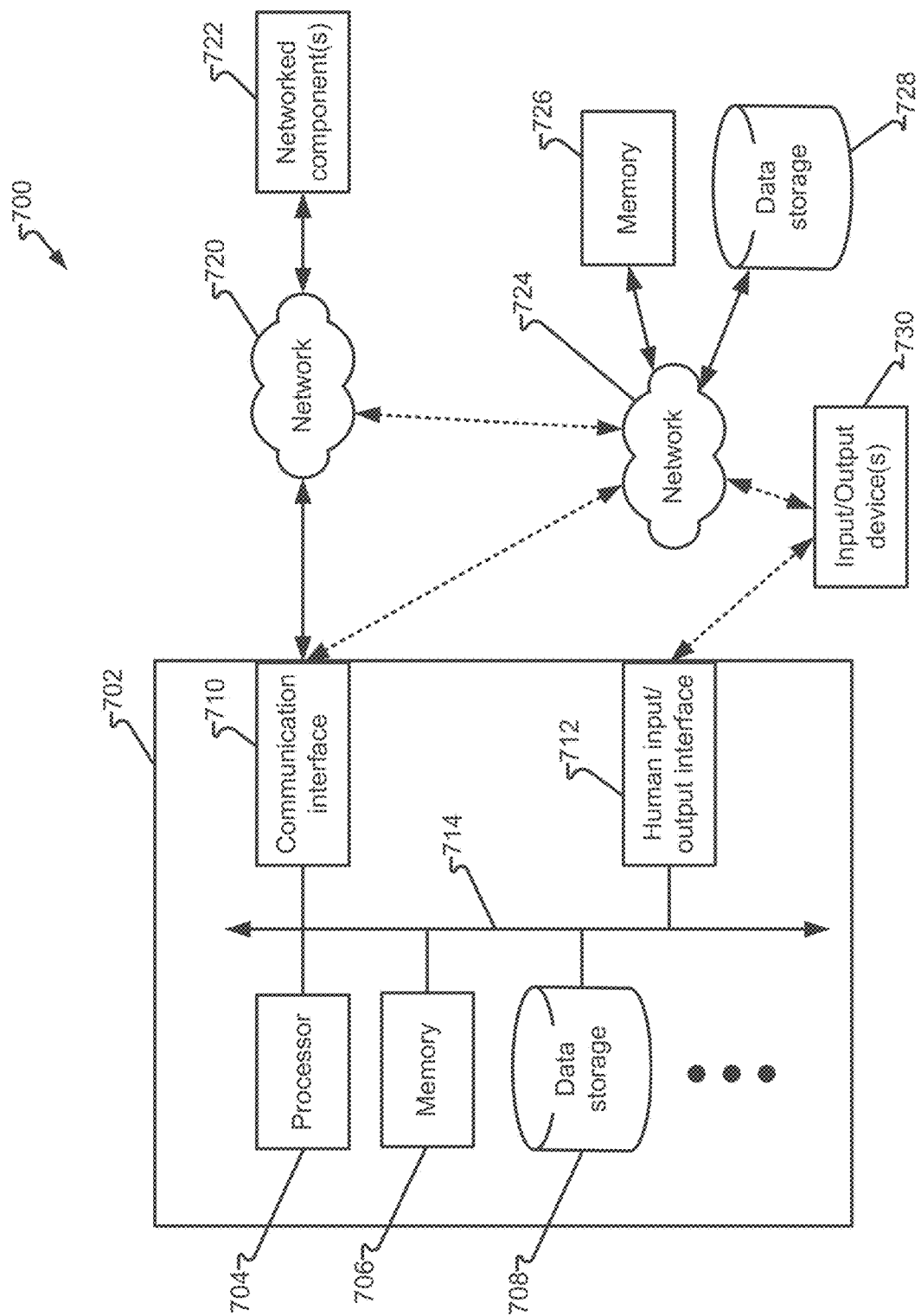
FIG. 7 depicts a system in accordance with embodiments of the present disclosure.

FIG. 7 depicts device 702 in system 700 in accordance with embodiments of the present disclosure. In one embodiment, server 104 and/or server 114, may be embodied, in whole or in part, as device 702 comprising various components and connections to other components and/or systems. The components are variously embodied and may comprise processor 704. The term "processor," as used herein, refers exclusively to electronic hardware components comprising electrical circuitry with connections (e.g., pin-outs) to convey encoded electrical signals to and from the electrical circuitry. Processor 704 may comprise programmable logic functionality, such as determined, at least in part, from accessing machine-readable instructions maintained in a non-transitory data storage, which may be embodied as circuitry, on-chip read-only memory, computer memory 706, data storage 708, etc., that cause the processor 704 to perform the steps of the instructions. Processor 704 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 714, executes instructions, and outputs data, again such as via bus 714. In other embodiments, processor 704 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 704 is a non-transitory computing device (e.g., electronic machine comprising circuitry and connections to communicate with other components and devices). Processor 704 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 704). Processor 704 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 704, device 702 may utilize computer memory 706 and/or data storage 708 for the storage of accessible data, such as instructions, values, etc. Communication interface 710 facilitates communication with components, such as processor 704 via bus 714 with components not accessible via bus 714. Communication interface 710 may be embodied as a network port, card, cable, or other configured hardware device. Additionally or alternatively, human input/output interface 712 connects to one or more interface components to receive and/or present information (e.g., instructions, data, values, etc.) to and/or from a human and/or electronic device. Examples of input/output devices 730 that may be connected to input/output interface include, but are not limited to, keyboard, mouse, trackball, printers, displays, sensor, switch, relay, speaker, microphone, still and/or video camera, etc. In another embodiment, communication interface 710 may comprise, or be comprised by, human input/output interface 712. Communication interface 710 may be configured to communicate directly with a networked component or configured to utilize one or more networks, such as network 720 and/or network 724.

Components disclosed herein may be interconnected, in whole or in part, by network 720. Network 720 may be a wired network (e.g., Ethernet), wireless (e.g., WiFi, Bluetooth, cellular, etc.) network, or combination thereof and enable device 702 to communicate with networked component(s) 722. In other embodiments, network 720 may be embodied, in whole or in part, as a telephony network (e.g., public switched telephone network (PSTN), private branch exchange (PBX), cellular telephony network, etc.).

Additionally or alternatively, one or more other networks may be utilized. For example, network 724 may represent a second network, which may facilitate communication with components utilized by device 702. For example, network 724 may be an internal network to an entity or other organization, whereby components are trusted (or at least more so) than networked components 722, which may be connected to network 720 comprising a public network (e.g., Internet) that may not be as trusted.

Components attached to network 724 may include computer memory 726, data storage 728, input/output device(s) 730, and/or other components that may be accessible to processor 704. For example, computer memory 726 and/or data storage 728 may supplement or supplant computer memory 706 and/or data storage 708 entirely or for a particular task or purpose. As another example, computer memory 726 and/or data storage 728 may be an external data repository (e.g., server farm, array, "cloud," etc.) and enable device 702, and/or other devices, to access data thereon. Similarly, input/output device(s) 730 may be accessed by processor 704 via human input/output interface 712 and/or via communication interface 710 either directly, via network 724, via network 720 alone (not shown), or via networks 724 and 720. Each of computer memory 706, data storage 708, computer memory 726, data storage 728 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 730 may be a router, a switch, a port, or other communication component such that a particular output of processor 704 enables (or disables) input/output device 730, which may be associated with network 720 and/or network 724, to allow (or disallow) communications between two or more nodes on network 720 and/or network 724. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i-4770K 22 nm Haswell, Intel® Core i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A computer-implemented method of generating document content creation rules, comprising:
   accessing a plurality of candidate documents, each candidate document comprising a plurality of document fragments and a plurality of candidate conditions;
   accessing a rule comprising a condition, each of the plurality of document fragments, and a rule identifier;
   analyzing the rule comprising analyzing the plurality of candidate documents to identify one of the plurality of candidate conditions that is true in a portion of the plurality of candidate documents each of which comprises a corresponding one of the plurality of document fragments being present therein;
   generating a first document to comprise visible content and hidden content, wherein generating the first document comprises evaluating the rule and, when the rule is true, including the corresponding one of the plurality of document fragments as a portion of the visible content and including the rule identifier of the rule as a portion of the hidden content; and
   providing the first document to a destination.

2. The computer-implemented method of claim 1, wherein accessing the rule further comprises accessing the rule identifier from the first document, and wherein the first document comprises the rule identifier as the hidden content.

3. The computer-implemented method of claim 2, wherein accessing the rule further comprises accessing the condition and the corresponding one of the plurality of document fragments from a first data storage that corresponds to the rule identifier.

4. The computer-implemented method of claim 1, wherein at least one of the plurality of document fragments comprises at least one of text or an image.

5. The computer-implemented method of claim 1, wherein the rule identifier comprises a Universally Unique Identifier (UUID).

6. The computer-implemented method of claim 1, wherein the rule identifier comprises the condition.

7. A system, comprising:
a computing device comprising at least one processor coupled to a computer memory comprising instructions therein executed by the at least one processor;
a data storage comprising a number of rules, each rule of the number of rules comprising a condition and a corresponding plurality of document fragments;
wherein the computing device generates a first document comprising visible content and hidden content, wherein generating the first document comprises evaluating the number of rules and, when at least one rule of the number of rules is true, including the corresponding plurality of document fragments as a portion of the visible content in the first document and including a rule identifier of the at least one rule of the number of rules as a portion of the hidden content; and
wherein the first document is provided to a destination.

8. The system of claim 7, wherein accessing the number of rules further comprises accessing the rule identifier from a second document, and wherein the second document comprises the rule identifier as the hidden content.

9. The system of claim 8, wherein accessing the number of rules further comprises accessing the condition and the corresponding one of the plurality of document fragments from a first data storage that correspond to the rule identifier.

10. The system of claim 7, wherein at least one of the corresponding plurality of document fragment comprises at least one of text or an image.

11. The system of claim 7, wherein the rule identifier comprises a Universally Unique Identifier (UUID).

12. The system of claim 7, wherein the rule identifier comprises the condition.

13. A system, comprising:
means to access a plurality of candidate documents, each comprising a plurality of document fragments and a plurality of candidate conditions;
means to access a rule comprising a condition, each of the plurality of document fragments, and a rule identifier;
means to analyze the rule comprising analyzing the plurality of candidate documents to identify one of the plurality of candidate conditions that is true in a portion of the plurality of candidate documents, comprising a corresponding one of the plurality of document fragments being present therein;
means to generate a first document to comprise visible content and hidden content and wherein the means to generate the first document further comprises means to evaluate the rule and, when the rule is true, means to include the corresponding one of the plurality of document fragments as a portion of the visible content in the first document and include the rule identifier as a portion of the hidden content; and
means to provide the first document to a destination.

14. The system of claim 13, wherein the means to access the rule further comprises means to access the rule identifier from a second document, and wherein the second document comprises the rule identifier as the hidden content.

15. The system of claim 14, wherein means to access the rule further comprise means to access the condition and the corresponding one of the plurality of document fragments from a first data storage that correspond to the rule identifier.

16. The system of claim 13, wherein at least one of the plurality of document fragments comprises at least one of text or an image.

17. The system of claim 13, wherein the rule identifier comprises the condition.

18. The computer-implemented method of claim 4, wherein the image comprises a video image.

19. The system of claim 13, wherein the rule identifier comprises a Universally Unique Identifier (UUID).

20. The system of claim 16, wherein the image comprises a video image.

* * * * *